June 15, 1965  R. F. DYER ETAL  3,188,713
APPARATUS FOR PROCESSING CROSS-SECTION YARN
Filed May 6, 1963  7 Sheets-Sheet 1

JAMES F. CAINES
RICHARD F. DYER
INVENTORS

BY R. Frank Smith
Harold N. Powell
ATTORNEYS

June 15, 1965     R. F. DYER ETAL     3,188,713
APPARATUS FOR PROCESSING CROSS-SECTION YARN
Filed May 6, 1963     7 Sheets-Sheet 2

FIG. 2.

JAMES F. GAINES
RICHARD F. DYER
INVENTORS
BY R. Frank Smith
Harold N. Powell
ATTORNEYS

June 15, 1965 R. F. DYER ETAL 3,188,713
APPARATUS FOR PROCESSING CROSS-SECTION YARN
Filed May 6, 1963 7 Sheets-Sheet 5

FIG. 5.

JAMES F. CAINES
RICHARD F. DYER
INVENTORS

BY R. Frank Smith
Harold N. Powell
ATTORNEYS

June 15, 1965     R. F. DYER ETAL     3,188,713
APPARATUS FOR PROCESSING CROSS-SECTION YARN
Filed May 6, 1963                                     7 Sheets-Sheet 7

JAMES F. CAINES
RICHARD F. DYER
INVENTORS

BY R. Frank Smith
Harold N. Powell
ATTORNEYS

United States Patent Office 3,188,713
Patented June 15, 1965

3,188,713
APPARATUS FOR PROCESSING CROSS-SECTION YARN
Richard F. Dyer and James F. Caines, Kingsport, Tenn., assignors to Eastman Kodak Company, Rochester, N.Y., a corporation of New Jersey
Filed May 6, 1963, Ser. No. 278,210
10 Claims. (Cl. 28—1)

This application is a continuation-in-part of our application Serial No. 591,906 filed June 18, 1956, now abandoned, and our application Serial No. 219,610, filed August 27, 1962.

This invention concerns apparatus for processing multifilament yarn to obtain novel yarn products having properties rendering the yarn especially useful for a number of purposes. More particularly, this invention concerns an apparatus which is useful on multifilament yarns especially wherein the filaments making up the yarn are of a cross-section different from the conventional round or clover-leaf configurations usually employed for polymeric filaments.

In our earlier applications aforementioned, we have described several procedures whereby multifilament yarns may be processed to produce volumizing effects thereon. Generally these methods have comprised passing such multifilament yarn through a jet wherein the yarn is contacted with a gaseous fluid whereby the blown yarn is crimped, entangled or otherwise altered or volumized. In many instances the processing of the yarn would be carried beyond internal entangling and to obtain external crimp or other volumizing of the yarn for softness, increased cover and wool-like appearance as well as ultimate improvement in hand of fabrics made therefrom.

In our earlier applications aforementioned, it has been further explained that in some treatments or the like that woven products therefrom have not been of as high quality as desired because of streaks and similar defects. Therefore, in our earlier application information has been set forth concerning the improvement of such processed yarns by features pertaining to the winding up of the yarn whereby the quality of the processed yarn is at least maintained approximately equivalent to that possessed by the yarn as it exits from the jet.

It is sufficient for the present apparatus invention to point out that further advances for the obtaining of high quality jet-treated yarn of a versatile nature represents a highly desirable result. From extending work in connection with the process and appearance of the yarn of our earlier applications, we have discovered several apparatus improvements which facilitate the production of processed multifilament yarn of the kind under consideration herein.

This invention has for one object to provide new apparatus for the crimping or entangling the individual filaments in a fiber bundle of continuous filament yarn, or both or otherwise to provide increased volume or other change in the resultant yarn product yet obtain yarn products which may be made up into fabrics without noticeable defects therein. Another object is to provide apparatus which includes means for subjecting multifilament yarns, wherein the filaments of the yarn have certain special cross-sections, to a jet type treatment whereby such combination gives different and unusual yarn products. A particular object is to provide a yarn blowing apparatus of the class indicated wherein the blown yarn product has utility for upholstery, chenille and rug manufacture and other purposes. Another particular object is to provide apparatus of the class indicated wherein there is provision for the exhausting of the gaseous treating fluid away from the processed yarns and the taking up of the yarn is in a manner such that the transformation imparted to the yarn in its processing is not materially altered. Other objects will appear hereinafter.

In the broader aspects of our invention we have found when an unheat-set multifilament polymeric yarn is simultaneously subjected to certain high temperatures and conditions which induce rapid changes in the magnitude and direction of the forces applied to the individual filaments that the filaments are individually deformed into a randomly distorted configuration. If these filaments are then heat-set at a temperature close to the melting point of the filamentary material, these random configurations will be permanently set into the fiber when it is cooled to room temperature. Moreover, in the case of many polymeric materials the heat-set operation induces filament shrinkage which further enhances the random distortions of the individual filaments thus adding to the bulk, softness, and covering power of a yarn comprised of a plurality of filaments treated in the aforesaid manner.

In another aspect of our invention it has been found with filamentary materials particularly those which are solvent spun, such as cellulose acetate, that there are residual stresses in the yarn due to the extrusion and curing process which can be released by exposure to a high temperature atmosphere such as superheated steam under conditions such that the filaments are alternately stressed and relaxed at a high frequency. This effect is particularly enhanced by the use of novel cross-section yarns spun in the manner disclosed by Hickey U.S. Patent 2,373,892, A. S. Smith U.S. Patents 2,825,120 and 2,838,364 and Raynolds et al. U.S. Patent 2,829,027. In particular it has been found that C and U shaped cross-section fibers have a high degree of residual internal stress which when released by a superheated steam jet treatment cause a high degree of distortion and resultant crimping of the individual filaments. It is thought that the differential curing and shrinkage of the cross-sectional shape of these novel cross-section fibers as described in the aforesaid patents is a source of the aforementioned residual stressed.

When similar novel cross-section filaments are melt spun and subsequently drafted using high polymeric materials such as polyolefins, polyesters, polyamides and copolymers of these materials similar residual stresses are also noted due not only to the different cooling rates of one portion of the cross-section relative to another portion but also due to the uneven manner in which the drafting forces are distributed across the area of an odd shaped (non-circular) cross-section.

In the broader aspects pertaining to the apparatus arrangement of the present invention we have found the following: A gaseous jet of the type described in Dyer Patent 2,924,868 in association with suitable yarn feeding, yarn heat treating and yarn winding means is suitable for inducing the aforementioned distortions of a filamentary material. Such apparatus has the added advantage of promoting a sufficient degree of interfilament entanglement or interweaving, if desired, as to preclude the need for subsequent twisting of the yarn to make it suitable for further use in such textile processes as weaving or knitting and tufting. This is an economic advantage.

In a further aspect the multifilament yarn processed in our apparatus has been found to have the random distorted shapes of treated filaments which more closely resemble the distribution found in such natural fibers as wool and cotton than does the sharply angular crimp produced in most man-made fibers by known stuffer box crimping methods. By collecting a plurality of distorted continuous filaments made by the process of this invention into a tow and cutting them into short staple lengths it has been possible to produce man-made staple fibers which more closely resemble the characteristics of such natural fibers as wool and cotton. However, in general we prefer to use the yarn treated in the apparatus of the present invention, in continuous filament form.

For assistance in a further understanding of our invention reference is made to the attached drawings forming a part of this application.

Figure 1:
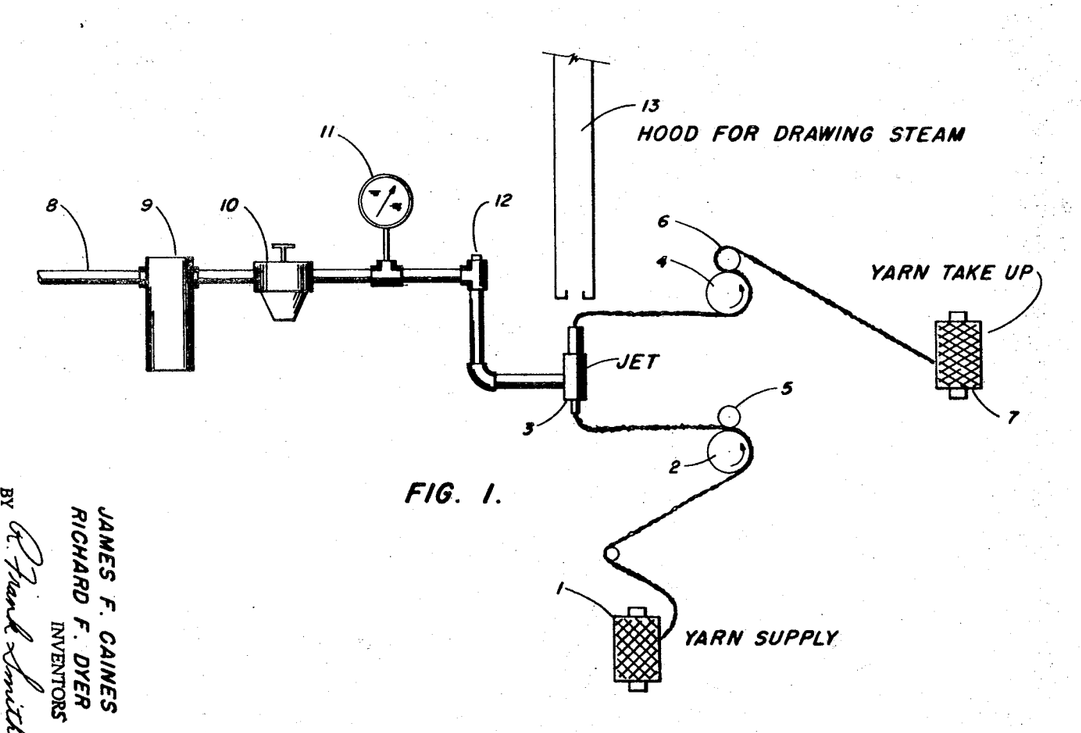
FIGURE 1 is a generic, schematic side elevation view of a steam jet and yarn control apparatus which may be used in carrying out one of the processes of the present invention.

Referring to FIGURE 1, the yarn which may be either twisted or zero twist is drawn from the supply package 1 by the input roll 2 and then proceeds through the steam jet 3 to the output roll 4. The weighted idler rolls 5 and 6 ride on the yarn and prevent slippage of the yarn on rolls 2 and 4. A suitable windup is generally indicated at 7. A particularly useful and novel windup which we prefer to use will be described in detail hereinafter. This apparatus is especially suitable for processing C cross-section multifilament cellulose acetate yarn.

Figure 2:
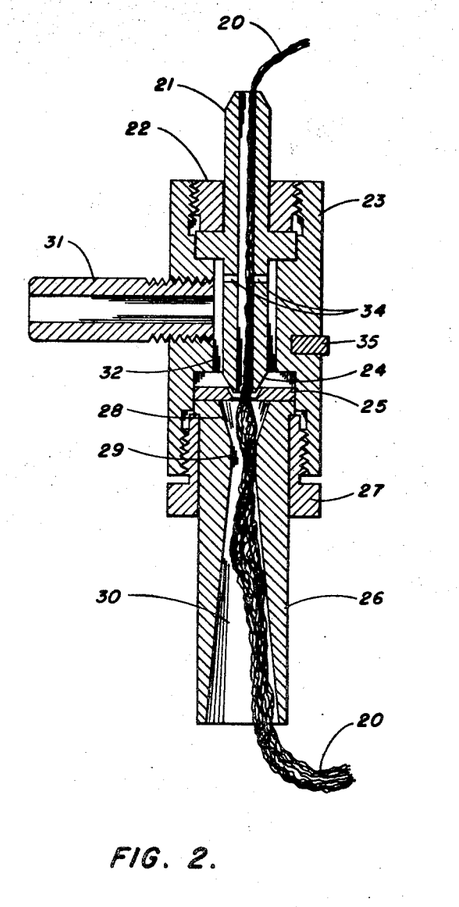
FIGURE 2 is a sectional view of one jet construction such as may be used.

FIGURE 2 concerns the details of a steam jet construction similar to that of U.S. Patent 2,924,868, which may be useful in the above apparatus combinations for crimping and/or entangling the filaments of the yarn. The yarn tube 21, which terminates in nozzle 24, is held in the jet body 23 by the threaded retaining ring 22. Close by adjacent to the nozzle and concentric with it is located an orifice plate 25 shaped as shown. Directly adjacent to the orifice plate is a venturi tube 26 held in the jet body by the threaded retaining ring 27. The venturi tube has a convergent entrance section 28, a short cylindrical throat 29 about the diameter of the orifice plate opening, and a long divergent exit section 30 with a taper of about 10° included angle.

Steam under a pressure which may be 5 p.s.i.g. to 200 p.s.i.g. is admitted through the inlet tube 31 to the annular chamber 32 in the body, whereupon it passes with very high velocity through the orifice plate opening. The steam loses some velocity in the venturi entrance section, but in the venturi throat the velocity is regained and may become even higher in the small portion of the divergent exit sections. At some point in the divergent section the steam velocity begins to decrease, and the presence of the yarn filaments tends to cause turbulent flow. The yarn 20 enters the yarn tube 21 and is mixed with the steam at the orifice plate, and mixing continues until the yarn reaches the exit taper of the venturi. At this point the divergence of the steam flow expands the yarn bundle and tends to separate the individual filaments allowing the steam to come in intimate contact with each filament. As the steam velocity decreases and as the filaments begin to crimp the tension is relaxed on the yarn, the filaments begin to become entangled.

After the steam passes through the area bounded by the orifice hole in orifice plate 25 and nozzle 24, a portion of the steam may be allowed to escape from chamber 28 by passing countercurrent to the yarn flow back through yarn tube 21. This reverse flow offers a very effective means for preheating the yarn, and the yarn tube 21 may be varied in length according to the amount of preheating desired. For extensive preheating the length of the jet may be increased so as to increase the length of chamber 32 which serves to prevent heat from escaping from the yarn tube 21. Under some circumstances, cartridge heaters 35 may be inserted in the walls of body part 23 in order to control and augment the steam temperature and superheat. Alternately, if desired, holes 34 may be drilled in the wall of tube 21 as shown in FIGURE 2 to introduce a portion of the steam into the interior of tube 21 from chamber 32 directly so as to preheat the yarn.

Figure 3:
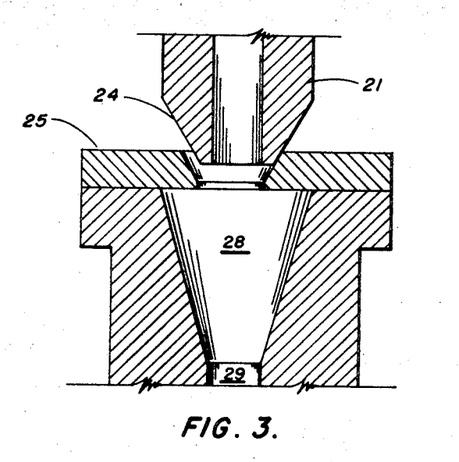
FIGURES 3 and 3a are enlarged partial views showing two variations of the jet of FIGURE 2 wherein certain of the parts are relocated.
Figure 3A:
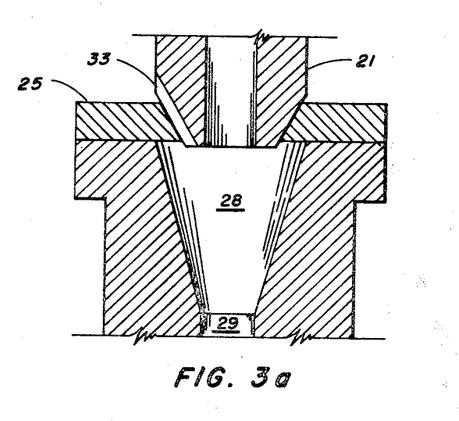
Figure 4:
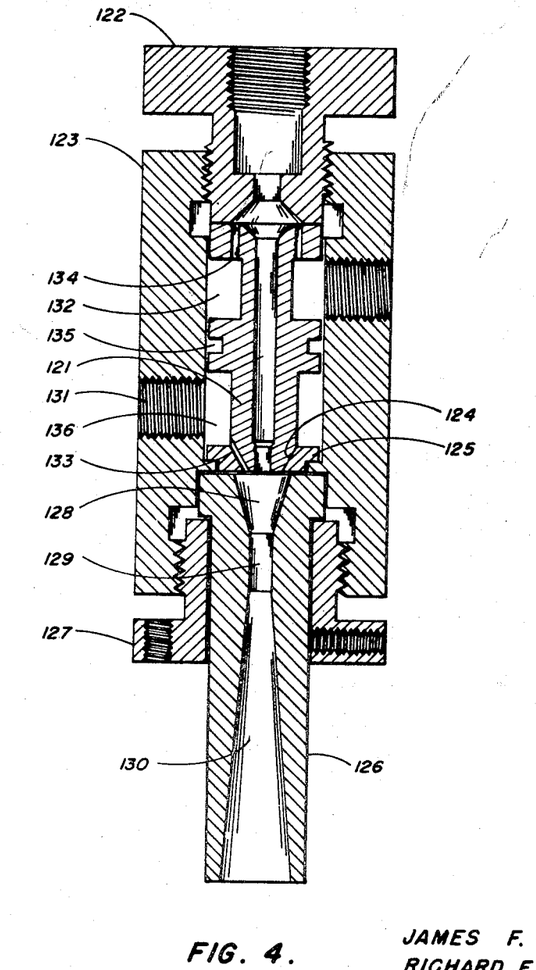
FIGURE 4 is an enlarged cross-sectional view showing further variations of the jet of FIGURE 2 wherein the yarn tube and tip are modified.

In the jet form of FIGURE 4 a divider flange and sealing O ring 135 may be used to divide the chamber 132 into a lower portion 136 for the admission of the texturing steam flow and an upper chamber 132 for the admission of a separate preheating steam of different pressure and temperature. The other parts 122, 123, 129 etc. correspond in general to the parts 22, 23, 29 etc. of FIGURES 2, 3 and 3a hence further description is unnecessary.

In the prior art arrangements the yarn was treated as a tow or yarn bundle and crimping was impeded because each filament was not in intimate contact with the steam. With the apparatus of the present invention, the heat and moisture furnished by the steam sets the crimp in the filaments before the yarn is withdrawn from the end of the venturi. The path of the yarn may be turned about 90° at the venturi exit to prevent the escaping steam from causing too much tension in the yarn during the aforesaid crimping and entangling or to separate the steam from the yarn. Also as shown in FIGURE 1 an exhaust hood is provided for removing the exhaust steam (heat) away from the yarn so that it will set. This hood is a useful and desirable feature of our apparatus.

FIGURE 3 shows a partial section through another jet which may be used for crimping and entangling the filaments of a continuous filament yarn. This jet differs from that illustrated in FIGURE 2 in that the orifice plate 25 is eccentrically located in respect to nozzle 24. This arrangement permits high velocity steam to act in an unbalanced manner on the untreated yarn emerging from the yarn tube 21; that is, the forces due to the steam acting on the yarn are unevenly distributed around the yarn bundle. The mixing of steam and yarn tends to soften the yarn and the yarn under the eccentric impulse of the steam flow is sharply bent away from a straight path and then still under the influence of the steam flow trying to recover its direction to flow through the throat of the venturi is again sharply reversed in direction three times. These four violent changes in direction of the plastic hot filaments reacting in a random manner to the violent changes in direction of the steam flow produce random distortion or crimping of the yarn filaments. The crimped yarn is carried from the chamber by the escaping steam while still in a semi-plastic state and is reduced in temperature along with the high velocity steam as expansion of the steam takes place in the diverging section 30 of the venturi tube 26, thus fixing the crimped configuration into the yarn structure. As expansion occurs, turbulence in the steam stream increases. This coupled with a reduction in yarn tension produces an interfiber working in the crimped yarn and at some point in the divergent section of the venturi tube as further expansion takes place the crimped yarn filaments are reassembled into a yarn in an entangled condition.

FIGURE 3a shows an arrangement of the nozzle tip 21 and the orifice plate 25 wherein the nozzle tip is concentric with and fits tightly against the mating tapered surface entrance of the orifice plate. A small milled slot 33 of suitable size is provided on one side of the nozzle tip 21 to admit the stream of treating fluid and direct it in an unbalanced manner onto the yarn issuing from the nozzle tip 21. It will be recognized that by suitable selection of the angles and shapes of the introduction of the hot fluid into the venturi entrance 28 that a longitudinal sine wave like deflection or vibration can be imparted to the yarn filaments to cause them to be stressed in a random nonuniform manner at a high frequency rate.

FIGURE 4 is a cross-sectional drawing of an improved jet found useful for the processing of continuous filament yarns. This jet differs from that depicted in FIGURE 2 in that the flow of the hot fluid is confined by a groove 133 in the yarn nozzle 121 acting in co-operation with orifice in orifice plate 125 so as to cause a more concentrated application of the steam in an unbalanced manner on the yarn filaments.

While it is not desired to be bound by any particular theory of operation, it appears that the violent, rapid and repeated reversal of the direction of movement of the yarn filaments in the region of the venturi entrance 128 is a major factor in bending the filaments in a random manner into a crimped state. It is also probable that some of the filaments on the side of the yarn away from the point of impingement of the main steam flow stream are bent and drawn sharply over the knife edge of the orifice plate 125 which would also cause a curling of the filaments to take place. It is also possible that some of the filaments may move directly from the outlet of yarn tube 121 at such a velocity that they strike and crumple against the surface of the venturi entrance 128. A further mechanism may occur because some of the filament adjacent the main steam flow are tensioned and elongated more in their softened hot state than other filaments in the yarn bundle on the side away from the main steam flow. These fibers will react differently in any subsequent heat treatment causing crimps and curls to develop.

The foregoing modes of crimp formation are in addition to those induced by the relief of internal stresses in the spun fiber when it is heated by the hot jet gas.

Referring again to FIGURE 1 the steam supply system, consists of a moisture separator and/or superheater 9, a pressure reducing value 10, pressure gage 11 and a thermocouple or thermometer well 12. High pressure steam enters the system at 8 and proceeds to the separator and/or superheater where the steam is adjusted to the desired state before it enters the pressure reducing valve. After functioning in the jet 3 the exhaust steam is withdrawn through hood 13. Satisfactory results have been obtained with steam initially at 115 p.s.i.g. and containing 1 to 2 percent moisture. The state of the steam upon entering the jet 3 preferably is such that condensation does not occur in the jet, since the process seems to be poorly operative when droplets of water are present in the jet. The steam temperature preferably is low enough to prevent damage to the yarn. In general the inlet pressure does not greatly affect the flow rate and average velocity in the jet. When the pressure is increased, the spacing between the orifice plate and yarn nozzle may be reduced to cause a suction in the yarn tube. This adjustment reduces the area of flow and thus offsets the effect of the increased pressure.

Figure 5:
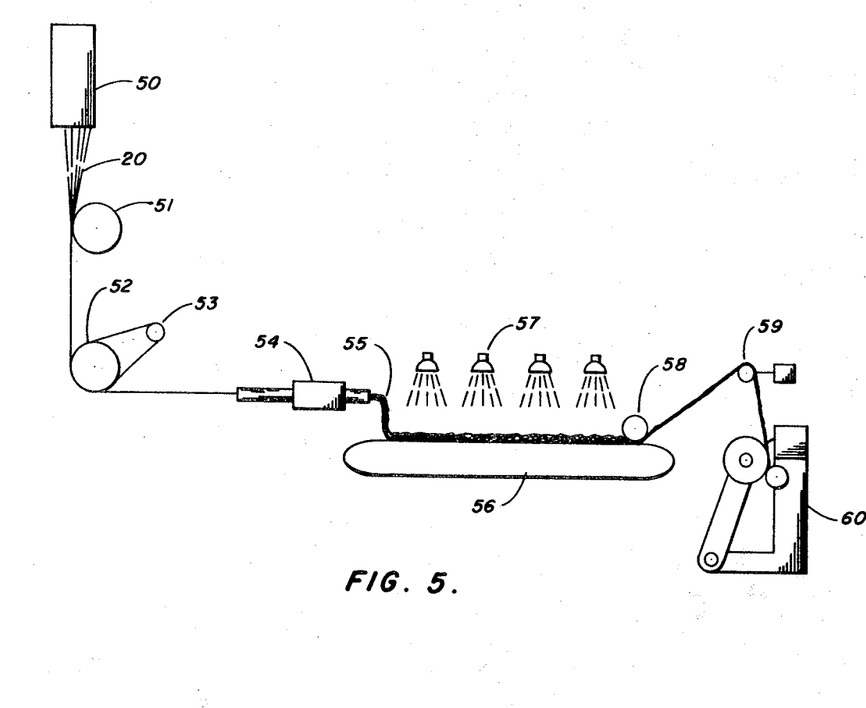
FIGURE 5 is a schematic side elevation view of another apparatus arrangement particularly suitable for high polymeric yarn materials.

FIGURE 5 shows an apparatus particularly suitable for the treatment of polypropylene multifilament yarn. The yarn 20 is extruded and cooled in cabinet 50 and removed from the cabinet by roll 51. It is continuously drawn between rolls 51 and 52 to improve its properties and orient the molecules. Draw roll 52 has associated with it a pinch roll not shown or an advancing roller 53 so as to develop the required drafting tensions. The yarn is then passed to a treatment jet of the type shown in greater detail in FIGURE 2. After treatment the yarn 55 falls or is deflected by a deflector (not shown) in a tensionless random manner on to a conveyor 56. Here, while in a relaxed state, it is subjected to heat by heat sources 57 or by a blast of hot air. As it leaves the conveyor it passes under an idler roll 58 over a tension compensating guide 59 and thence to a tube windup machine 60. The preferred windup apparatus will be described hereinafter. If desired, chilling air can be directed on the yarn just prior to roll 58 to insure that the crimp is "frozen" into the fiber before it is withdrawn for winding.

Figure 6:
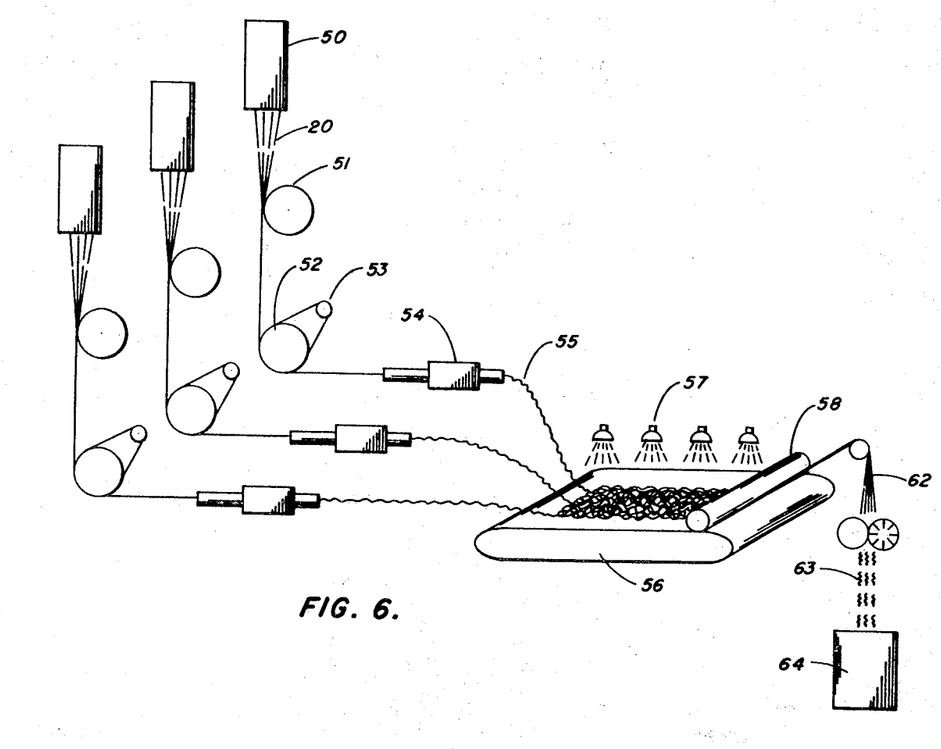
FIGURE 6 is a schematic side elevation view of an apparatus arrangement for producing a staple fiber product.

FIGURE 6 shows an apparatus arrangement for producing staple fiber using a rearranged apparatus. A high polymer material such as polypropylene, polyester or polyamide is melt spun from a plurality of cabinets, drafted and introduced to a plurality of treating jets. The yarns are then puddled into the heat setting conveyor and heat-set. The plurality of yarns are then removed from the conveyor as one large yarn bundle and passed to a staple cutter 62 where the continuous filaments are cut into short staple lengths of ½ to 6" as desired and packaged in boxes or bales 64.

Referring again to FIGURE 1, the suppy yarn comes from the supply package 1 which is usually a bobbin on the two-for-one spindle or uptwist spindle. This yarn goes around a guide onto the first feed rolls 2 and 5. The feed rolls may be equipped in a manner to help feed the yarn and prevent yarn slippage. From these first feed rolls the yarn is fed through a steam jet device 3 to second feed rolls, 4, 6 or the like take-up roll.

The amount of crimp or the like volumizing put in the yarn will be determined by the relation of the roll speeds and similar factors. That is, this may be determined by the size of the sprocket gear or sheave (not shown) driving the second feed roll in relation to the sprocket gear or sheave (not shown) driving the first feed roll. Unless the second rolls (take-up rolls), assuming they are the same size as the feed rolls, are run at a slower speed than the feed rolls, there would be little volumizing. By running the second rolls slower, there is greater volumizing since more contraction in the yarn is thereby permitted.

Figure 7:
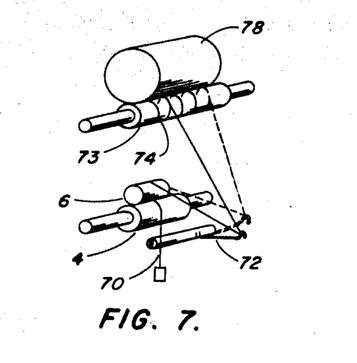
FIGURE 7 is a semi-diagrammatic schematic view of a windup such as we prefer to use to take up the yarn processed in the associated apparatus of the present invention.

Or reference to FIGURE 7 from the second rolls 4, 6 the yarn 70 passes over member 72 which is a part of the compensating guide of the present invention, and the yarn then is wound on a surface driven wind-up package 78 with a mechanical traverse 73, 74. As the traverse guide moves the yarn from the end to end on the package, the tension in the yarn varies from a low tension in the middle of the package to a high tension at the end of the package or traverse. This difference in tension becomes larger as the length of the traverse is increased.

We have found that this difference in tension in jet processed yarn may be undesirable; it will stretch the yarn at the points of high tension. The stretched yarn in turn will tend to produce streaks in the finished fabric made from such yarn.

To overcome this problem a winder has been built to keep the tension constant throughout the traverse of the jet processed yarn. As shown in FIGURE 7 one of the several spring compensating guides 72 that can be used is depicted. The yarn traversing drive roll 73 which has the traverse 74 cut into the surface of the roll can be used for the mechanical traverse. The spring compensating guide 72 relieves the high tension from end to end by bending towards the package to shorten the yarn path and relieve the tension as the tension starts to build up.

In other words, the tension in the yarn never varies more than a few grams from the desired tension or more than in the order of plus or minus 2–5 percent. The spring in the spring compensating guide is selected so as to have a very low spring rate or ratio of force to deflection. Thus the spring guide can deflect the required amount to maintain essentially a constant length of yarn between the feed rolls 4, 6 and the point of the yarn going on the package 78. Yet the change in force required to deflect the spring this amount is very small. The type of spring most suitable is a spiral clock type spring.

Figure 8:
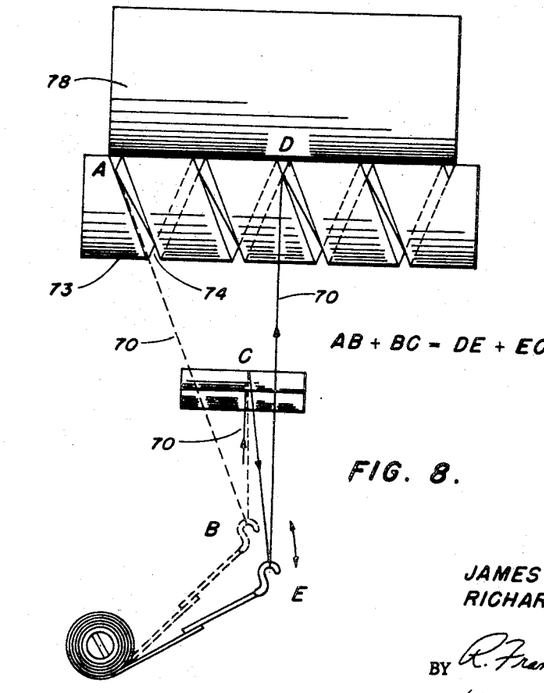
FIGURE 8 is a front view, similar to FIGURE 7 but on a larger scale, of our preferred windup apparatus.

The foregoing perhaps may be further understood by referring to FIGURE 8 in which the parts are the same as in FIGURE 7 and bear the same reference characters. In addition, in this FIGURE 8, the yarn path has been designated by the letters A, B, C, D and E. The addition of the formula of the yarn path $(AB+BC=DE+EC)$ will further define the relationship of the guide of this invention to the package traverse.

Figure 9:
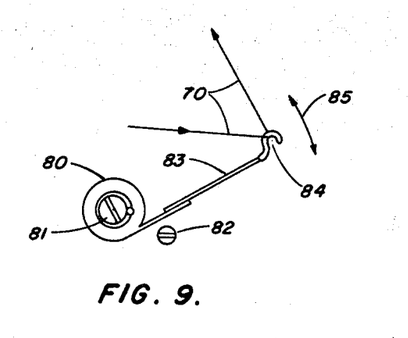
FIGURE 9 is a side elevation detailed view of the spring member which may be used in our windup construction.

FIGURE 9 shows one form of spring compensating device in greater detail. A spiral clock spring 80 is fastened at one end to adjustable screw 81. The screw 81 is threaded into the frame of the windup machine (not shown) and secured with a lock nut, thus the screw can be turned to loosen or tighten the spring 80. At the extended end of the spring 80 a light rod 83 is fixed with a wear resistant thread guide 84 at the outer end. When not in use the spring is kept from unwinding by stop 82. When in use the compensating spring and guide are free to oscillate as shown by the arrow to lengthen and shorten the length of the path the yarn 70 follows. In this way the tension in the yarn never builds up to the point where it will stretch (pull out crimp) or cause an unevenness in the yarn.

The operation of our apparatus is apparent to a substantial extent from the description which has already been set forth. However, a brief recapitulation will further clarify the present apparatus invention.

Referring to FIGURE 1, previously prepared multi-filament yarn is positioned at 1. This previously prepared yarn may be of a variety of deniers from 100 denier to 5000 denier, for example. Also, the multifilament yarn may vary from 50 filament yarn to 450 filament yarn. The yarn may have some twist in it as prepared but also may be zero twist or producer twist. In any event, as it is fed off from package 1 it is usually preferred in some instances that it have more than four turns therein of either S or Z twist or a combination. However, the twist may be varied from zero turns up to, for example, 20 turns. The multifilament yarn passes through guides to the feed rolls 25 which are driven in a manner to feed the yarn at a certain predetermined rate, say for example between 20 and 100 yds./min.

Yarn thus fed enters the jet 3 wherein gaseous fluid is introduced, thereby causing the crimping or volumizing of the yarn. The gas fluid pressure used will depend upon the venturi throat diameter, the type of yarn, the treatment desired and the like factors.

The volumized yarn is taken away from the jet by means of rollers 4, 6. These rollers can be positioned in various locations with respect to the jet. However, it is generally preferred to position the take-up in a manner that the yarn is removed from the jet angularly as shown. Even removing the yarn at substantially right angles to the jet is quite satisfactory. As has already been pointed out above, rolls 4, 6 will be operated at a suitably slower speed or are of a smaller diameter so that the rate of speed of take-up of the yarn is less than the rate of feed of the yarn to the jet.

After the yarn has been processed in the jet we have found that it becomes particularly useful that the yarn be handled in a manner so that the processing put into the yarn is not impaired. In accordance with our detailed preferred invention the yarn from take-up rolls 4, 6 is conducted to a package 7 the details of which have been described with respect to FIGURES 7, 8 and 9.

A further understanding of our invention will be had from a consideration of the following examples which are set forth to illustrate certain preferred embodiments of operation.

Example 1

A 2200 denier acetate carpet yarn was produced in accordance with the invention under the following conditions on the apparatus of FIGURE 1:

Untreated yarn—1900/16 d./f. with .6 Z twist U cross section filaments.
Steam inlet pressure—20 p.s.i.g.
Steam inlet temperature—275° F.
Steam flow rate—0.47 lbs./min.
Input yarn speed—50 y.p.m.
Output yarn speed—37.5 y.p.m.
Yarn nozzle diameter—0.154".
Orifice diameter—0.177".
Venturi throat diameter—0.189".
Windup condition—parallel package, as in our parent application Serial No. 591,906, with no twist added.

The resulting yarn was made into a 3 ply yarn with 1½ S.t.p.i. twist. This 3 ply yarn was then tufted into a cut-pile carpet with ½" pile height and 38 oz./yd.² weight. The carpet sample was processed by conventional wet finishing methods and flat dried without tumbling. The finished carpet had a very uniform appearance since all of the tufts were standing erect and there was no separation of the tufts between the rows of stitches. A similar carpet for comparison purposes was made with air lofted yarn (entangled and looped but not crimped) in place of the steam lofted yarn, and this carpet was finished in the same manner as the carpet mentioned above. The carpet with air lofted yarn had an uneven appearance because some of the tufts were not standing erect, but were leaning over, thus exposing the sides of the tufts. The covering ability of the air lofted yarns was not as good as that of the steam lofted yarn since the finishing process tended to remove the loops in the cut pile ends of the air lofted yarn and the yarn filaments tended to return to their original straight undistorted configuration. The steam crimped yarn of this invention, however, because of the crimp in the filaments had superior cover and bloom and the wet finishing did not remove the crimp and had less effect on the fiber entanglement.

Example 2

Samples of 4520 denier bright lustre 16 d./f., U-shaped cross-section yarn having .6 t.p.i. Z were procesesd using air lofting and the steam treating techniques of the present invention under closely parallel conditions as will be set forth below.

| Yarn Identity | Air Process—Test No. 616-4 | Steam Process—Test No. 621-4 |
|---|---|---|
| Starting Yarn Denier | 4,520 | 4,520. |
| Finish Yarn Denier | 4,928 | 5,160. |
| Percent Actual loft | 10 percent | 15 percent. |
| Yarn speed | 30 y.p.m. to jet | 30 y.p.m. to jet |
| Percent theoretical loft | 26.5 percent | 26.5 percent. |
| Yarn speed | 24.7 y.p.m. from jet | 24.7 y.p.m. from jet. |
| Steam pressure | | 27 p.s.i. gage. |
| Air pressure | 22 p.s.i. gage | |
| Steam temperature | | 265° F. |
| Yarn spec. vol. cu. ins./lb | 103 | 117. |
| Strength g./d. dry | .85 | .71. |
| Stretch percent dry | 31.4 percent | 32.5 percent. |
| Yarn appearance | Entangled filament loops. | Entangled crimped filaments. |

The air treated yarn did not have crimp. The end of the steam processed yarn of the present invention had decided crimp clearly visible in the filaments. A close examination of the central core and filaments of the yarns revealed a decided crimp in the filaments of the steam treated sample. In observing the air treated sample, the parallelism of the central filaments is more evident than in the steam treated sample, and the fiaments were not crimped and entangled as in the steam lofted sample. The crimped structure of the steam treated yarn resulted in about 14 percent more specific volume than that of the air treated sample.

Example 3

A 2200 denier 8 d./f. polymeric yarn suitable for scatter rug construction and other uses where a soft hand is desired was produced in accordance with the invention under the following conditions:

Untreated yarn __________ 1900/8 d./f./U section/.6 Z t.p.i.
Steam inlet pressure ____ 30 p.s.i.g.
Steam inlet temperature. 280° F. (approximately).
Input yarn speed _______ 50 y.p.m.
Output yarn speed _____ 40 y.p.m.

It will be noted that in this example a special cross-section yarn was also processed. The resultant yarn was made into a 3 ply yarn with 1½ t.p.i. S twist, and then the 3 ply yarn was tufted into a carpet with ½" pile end weight of about 32 oz./yd.² A comparable air treated yarn was made into a carpet with identical construction for the purpose of comparison. From the standpoint of appearance the steam-treated cross-section yarn did not show the individual tufts and rows of tufts as much as the air-lofted sample. For this reason the steam-treated sample had a smoother, more homogeneous surface with less directional effects. The hand of the air-lofted sample was not as soft as that of the steam-lofted sample, since the individual tufts could be felt more easily in the air lofted sample.

Example 4

To illustrate the wide range in the denier of the polymeric yarn which can be processed in accordance with the invention, the following example of a steam blown weaving yarn is given:

Starting denier __________________ 310 (75 filaments).
Finish denier ____________________ 360.
Yarn speed to jet ________________ 40 y.p.m.
Yarn speed from jet ______________ 32 y.p.m.
Percent theoretical loft ___________ 25.
Percent actual loft _______________ 16.
Steam inlet pressure _____________ 8 p.s.i.g.
Steam inlet temperature __________ 275° F.
Yarn strength ___________________ 0.77 8/d.
Yarn stretch ____________________ 19.2 percent.
Windup condition ________________ 4, 88 Z t.p.i. added.

This yarn was woven as filling yarn into a plain weave fabric and good cover was obtained with no noticeable defects.

The size of the jet was scaled down in proportion to the denier of the yarn. It should be noted that the steam pressure was only 8 p.s.i.g. in processing the weaving yarn.

Example 5

A continuous filament polypropylene yarn for carpet use was processed as in FIGURE 1 through a steam fed jet altered as shown in FIGURE 3. The following conditions were used:

Untreated yarn ____________ 1200 denier, 15 d./f., Y. cross-section, zero twist.
Input yarn speed __________ 53 y.p.m.
Output yarn speed _________ 32 y.p.m.
Steam inlet pressure to jet ___ 60 p.s.i.g.
Displacement of orifice in plate 25 ___________________ .007".

The resultant 1600 denier yarn was an attractive internally entangled crimped yarn, the texture of which was enhanced by random crimp in the individual filaments

Example 6

A continuous filament polypropylene yarn was processed as in FIGURE 1 through a steam fed jet altered as indicated in FIGURE 4. The processing conditions were as set forth in our companion process application Serial No. 219,610. The yarn produced was found to be highly voluminous with a size of about 5000 denier. The yarn was remarkably uniform in appearance and due to the crimp was quite resilient in hand. The yarn was different from that produced at lower yarn speeds in that the texture was due to a higher degree of crimp in the individual filaments.

When placed in a looped pile tufted carpet the cover obtained was outstanding and no streaks were present.

Example 7

A drawn 560 denier 31 filament 1 Z twist nylon filament yarn made by Allied Chemical Division, National Aniline Division, was treated in the process of FIGURE 1 using a jet similar to that of FIGURE 5. The yarn was fed to the jet at 150 grams tension at 302 feet per minute and removed at 12 grams tension at 160 feet per minute. The jet was operated at a temperature of 344° F. using heated 112 p.s.i.g. steam. The yarn was preheated to 275° F. in the yarn entrance tube of the jet. The yarn had a good random crimp configuration.

Example 8

A drawn 1100 denier 12 d./f. drawn polyester yarn known in the trade as Kodel was processed to the general process of FIGURE 1 and at conditions similar to those of Example 7 except that a higher jet temperature of 500° F. was required to obtain a good crimp configuration.

In general the high polymeric fibers having higher melting points require higher jet temperatures to achieve good crimping of the filaments. Higher yarn speeds through the jet also require higher temperatures, as demonstrated by the foregoing examples.

While our apparatus has been found most worthwhile in treating continuous filament yarns, interesting results have been obtained with the processing of yarns composed of staple fibers that were twisted in conventional fashion. It is not desirable that such yarns be treated so as to provide the open highly voluminous yarns found useful with continuous filament yarns, rather a fluffy yarn with a hard twisted core is desired.

While our apparatus will work on conventional or regular round yarn, we have discovered that enhanced results can be obtained utilizing yarns having filaments therein of a configuration which we term in this application as cross-section yarns. Although in the above examples we have illustrated the processing of U, Y, or C type cross-sections, our invention is not limited thereto or to the yarn being composed of a particular polymer. For example, X, L, I and other cross-sections of acetate, modacrylic, polyester or other polymeric compositions may be processed in a manner similar to the examples already set forth. Also, mixtures of the various cross-sections may be used.

The exact manner of preparing the cross-section yarn utilizable in accordance with the present process is not a limitation on the present invention. Such type yarns may be made by the process of Raynolds et al. U.S. Patent No. 2,829,027 or by companion pending U.S. application Serial Nos 735,607 (now U.S. Patent 3,077,-633) and 808,435.

It is believed apparent from the foregoing that we have provided a novel but relatively simple apparatus particularly useful for processing polymeric cross-section yarns whereby new yarn products may be produced, which products have increased covering power, enhanced appearance and other desirable properties. Such type yarns are useful in rug manufacture and for several other purposes and are considered as having more utility than conventional yarns for such purposes either such conventional yarns as produced or as air jet blown or otherwise processed by prior art methods.

Although the invention has been described in considerable detail with particular reference to certain preferred embodiments thereof, variations and modifications can be effected within the spirit and scope of the invention as described hereinabove, and as defined in the appended claims.

We claim:
1. An apparatus arrangement for preparing bulked yarn comprising means for feeding the yarn through a guide member and then around a first roll means, a yarn bulking jet adapted to receive said yarn from the first roll means, a second roll means in close proximity to the jet for receiving the bulked yarn from the jet, the roll means being characterized in that the first roll means is adapted to feed the yarn to the jet at a faster speed than the second roll means takes up the yarn from the jet, a yarn take-up and packaging means in series with said second roll means and in generally the same vertical plane, and a tension compensating means positioned in approximately the same plane, said tension compensating means being comprised of a spring device having a relatively inflexible rod connected to said spring device with one yarn guide on the end thereof, whereby a substantially uniform distance of yarn travel is maintained between said second roll means and said packaging means and the yarn is fed to the package in a uniform manner with substantially uniform stretch imparted so that the degree of loopiness along the yarn will be uniform and even.

2. An apparatus for jet-processing multifilament multilobal cross-section yarn comprising a jet, means for feeding said multilobal multifilament cross-section yarn to the jet and means for taking up said yarn from the jet, the jet having a venturi section in its make-up and being positioned between the yarn feeding means and the yarn take-up means, an orifice plate, and a yarn feeding tube centered on the same axis as the orifice plate, a supply line for steam leading to said jet and adapted to supply said steam into the jet, said supply line being provided with a superheater and a pressure reducing means, and a hood means positioned above and clearing the exit of the jet for taking up the exhaust hot steam associated with the exit of the jet.

3. An apparatus in accordance with claim 2 wherein the orifice plate is concentric with the yarn tube and in sealed fitted relation therewith and the tip of the yarn tube is provided with a steam entry slot inclined at an angle of 10° to 50° to the longitudinal axis of the jet assembly and intersecting said axis.

4. An apparatus in accordance with claim 3 wherein the steam entry slot, orifice plate and venturi section constitute in combination a reflective passageway for the steam for imparting a sine wave-like deflection to the yarn filaments along the longitudinal axis of the jet.

5. The apparatus of claim 2 wherein the jet is constructed to permit some reverse flow of the steam whereby the multifilament yarn entering the jet is preheated.

6. The apparatus of claim 2 wherein the jet is equipped with cartridge heaters whereby the multifilament yarn passing through the jet may be given a supplemental heating in addition to the heat from the hot gaseous fluid.

7. The apparatus of claim 2 wherein the jet has orifices in the tube walls whereby some of the steam may contact the multilobal multifilament yarn before the yarn passes the orifice plate.

8. The apparatus of claim 2 wherein the exhaust hood is positioned in line with and in close proximity to the exit from the jet whereby the steam is exhausted away from the processed yarn, which yarn is withdrawn angularly from the jet without interference from said hood.

9. The apparatus of claim 2 wherein the yarn take-up means includes a package winder provided with a compensator device whereby the volumizing effect transmitted to the multifilament yarn in the jet is not materially altered in winding the yarn into a package so that the degree of crimps along the yarn will be uniform and even.

10. An apparatus of the class indicated comprising the combination of means for feeding multifilament yarn into a jet to impart a crimp thereto, a jet adapted to impart uneven periodic distortion and variation in filament crimps in the yarn by bringing the yarn into contact with a gaseous fluid at above room temperature, means including a heater for supplying the gaseous fluid to the jet, and hood means for exhausting the fluid from the jet, the sub-combination for taking up on a package the exhausted yarn which has been thus processed in the jet, said sub-combination comprising a parallel package winder equipped with transverse means and a compensator, said compensator functioning to minimize any uneven reduction of said volumizing in the said yarn in the zone from the jet to the package.

References Cited by the Examiner

UNITED STATES PATENTS

| | | | |
|---|---|---|---|
| 2,290,929 | 7/42 | Whitehead | 57—34 |
| 2,426,473 | 8/47 | Straw | 242—147 X |
| 2,634,491 | 4/53 | McDermott | 57—34 |
| 2,852,906 | 9/58 | Breen | 57—34 |
| 2,924,868 | 2/60 | Dyer | 57—34 |
| 2,942,402 | 6/60 | Palm | 57—34 |
| 2,956,328 | 10/60 | Faw | 57—34 |
| 2,982,000 | 5/61 | Gonsalves | 57—34 |
| 3,005,251 | 10/61 | Hallden et al. | 57—34 |
| 3,009,309 | 11/61 | Breen et al. | 57—34 |
| 3,036,357 | 5/62 | Cook et al. | 28—72 |
| 3,055,080 | 9/62 | Claussen et al. | 28—1 |
| 3,103,731 | 9/63 | Salyer et al. | 57—34 |
| 3,127,729 | 4/64 | Head | 57—34 |
| 3,142,147 | 7/64 | Betsch | 57—140 |

MERVIN STEIN, *Primary Examiner.*

UNITED STATES PATENT OFFICE
CERTIFICATE OF CORRECTION

Patent No. 3,188,713                      June 15, 1965

Richard F. Dyer et al.

It is hereby certified that error appears in the above numbered patent requiring correction and that the said Letters Patent should read as corrected below.

Column 1, line 36, after "some" insert -- instances although the yarn has been improved by volumizing --; column 5, lines 37 and 38, for "filament" read -- filaments --; column 6, line 19, before "yarns" insert -- plurality of treated --; line 25, for "suppy" read -- supply --; column 8, line 73, for "fiaments" read -- filaments --; column 10, line 27, after "processed" insert -- according --; column 12, line 33, for "transverse" read -- traverse --.

Signed and sealed this 2nd day of August 1966.

(SEAL)
Attest:

ERNEST W. SWIDER
Attesting Officer

EDWARD J. BRENNER
Commissioner of Patents